US006848499B1

(12) United States Patent  
Bhatia

(10) Patent No.: US 6,848,499 B1
(45) Date of Patent: Feb. 1, 2005

(54) HEAT EXCHANGER FOR A PORTABLE COMPUTING DEVICE UTILIZING ACTIVE AND PASSIVE HEAT DISSIPATION MECHANISMS

(75) Inventor: Rakesh Bhatia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/684,143

(22) Filed: Oct. 5, 2000

Related U.S. Application Data

(62) Division of application No. 09/028,203, filed on Feb. 23, 1998.

(51) Int. Cl.[7] .............................. F28F 7/00; F28D 15/04
(52) U.S. Cl. ................... 165/80.3; 165/104.26; 165/104.33; 361/687; 361/700; 257/715
(58) Field of Search ..................... 165/80.3, 104.26, 165/104.21, 104.33, 274, 46; 361/700, 687; 257/715, 722

(56) References Cited

U.S. PATENT DOCUMENTS

| | | | | |
|---|---|---|---|---|
| 3,604,503 A | * | 9/1971 | Feldman, Jr. et al. | 165/274 |
| 4,230,173 A | * | 10/1980 | Eastman et al. | 165/274 |
| 5,021,679 A | | 6/1991 | Fairbanks et al. | |
| 5,044,426 A | * | 9/1991 | Kneidel | 165/274 |
| 5,153,535 A | | 10/1992 | Fairbanks et al. | |
| 5,159,972 A | * | 11/1992 | Gunnerson et al. | 165/224 |
| 5,307,003 A | | 4/1994 | Fairbanks et al. | |
| 5,627,412 A | | 5/1997 | Beard | |
| 5,661,637 A | * | 8/1997 | Villaume | 165/104.26 |
| 5,752,011 A | | 5/1998 | Thomas et al. | |
| 5,771,967 A | * | 6/1998 | Hyman | 165/104.26 |
| 5,917,699 A | * | 6/1999 | Hung et al. | 165/104.33 |
| 5,974,557 A | | 10/1999 | Thomas et al. | |
| 6,082,443 A | * | 7/2000 | Yamamoto et al. | 165/104.26 |
| 6,105,662 A | * | 8/2000 | Suzuki | 165/104.33 |
| 6,167,955 B1 | * | 1/2001 | Van Brocklin et al. | 165/104.26 |
| 6,216,235 B1 | | 4/2001 | Thomas et al. | |
| 6,487,668 B2 | | 11/2002 | Thomas et al. | |

* cited by examiner

Primary Examiner—Ljiljana Ciric
(74) Attorney, Agent, or Firm—Ami Patel Shah

(57) ABSTRACT

A heat exchanger. The heat exchanger includes a first heat dissipation mechanism having a first heat dissipation capacity and a second heat dissipation having a second heat dissipation capacity. At least one heat transfer mechanism thermally couples the first heat dissipation mechanism and the second heat dissipation mechanism to a heat generating component. The heat transfer mechanism has a limited conductivity portion in the thermal path to either the first or the second heat dissipation mechanism.

17 Claims, 5 Drawing Sheets

HEAT EXCHANGER FOR A PORTABLE COMPUTING DEVICE UTILIZING ACTIVE AND PASSIVE HEAT DISSIPATION MECHANISMS

This application is a division of application Ser. No. 09/028,203, filed Feb. 23, 1998.

BACKGROUND OF THE INVENTION

1. Field of the Invention

The present invention pertains to the field of heat dissipation in an electronic device. More particularly, the present invention pertains to the use of multiple heat dissipation mechanisms to cool one or more electronic components.

2. Description of Related Art

Faster and more powerful computer components allow the design and construction of higher performance portable computing devices such as laptop or notebook computers. Unfortunately, the use of such faster and more powerful computer components often results in increased heat generation by such computing devices.

Additionally, as some computer components shrink and/or increasing computer component integration shrinks overall computer size, electronic components may be arranged in a more compact form. Such increasing component density coupled with decreasing overall computing device size inherently decreases space available for convective airflow and accordingly raises heat dissipation concerns. Thus, improved heat dissipation technology is often needed to maintain operating temperatures within an acceptable range in smaller and/or more powerful portable computing devices.

Maintaining operating temperatures of computer system components below certain levels is important to ensure performance, reliability, and safety. Most integrated circuits have specified maximum operating temperatures, above which the manufacturer does not recommend operation. Additionally, transistors on an integrated circuit tend to slow down as operating temperature increases. Thus, a computer system that operates its integrated circuits close to or beyond recommended timings may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate spreading of heat throughout a computer system base or efficiently expelling heat to avoid hot spots near certain components such as a processor.

One prior art technique for cooling an electronic component in a portable computing device is to conduct heat from the electronic component to a plate beneath the device's keyboard using a heat pipe affixed by a heat conductive block to the electronic component. As increasing amounts of heat are generated by the electronic component, this technique may cause the plate beneath the keyboard and hence the keyboard to reach temperatures which are too hot for safe or comfortable use. Thus, such passive heat dissipation techniques may prove insufficient in some applications.

Active techniques have also been employed to cool electronic components in portable computing devices. One example of a prior art active heat dissipation technique is to use a fan based heat exchanger. In one prior art approach, a thermal connection exists between an electronic component and a fan based heat exchanger having heat dissipation fins. The thermal connection includes a thermal block connecting the electronic component to the heat pipe and, in some cases, the heat pipe being connected to the heat dissipation fins through an outer casing of the heat exchanger.

Each additional element in the thermal path from the heat generating component to the heat dissipation mechanism may result in decreased thermal conductivity between the electronic component and the heat dissipation fins. As a result, a thermal path from the electronic component to the fins having numerous elements may be somewhat inefficient. Moreover, if active heat dissipation is the only mechanism provided for heat dissipation, the active dissipation is likely necessary when the portable computing device is relying on battery power. Consequently, the active thermal solution may disadvantageously drain the battery.

Thus, the prior art does not adequately combine multiple heat dissipation mechanisms to cool portable computing devices. The prior art also does not provide a combination active and passive thermal solution which enables the active dissipation mechanism at a varying power level based on temperature and/or power source. Furthermore, the prior art does not demonstrate the use of multiple heat dissipation mechanisms where a passive heat dissipation mechanism is coupled to a heat generating component by a thermal path having a limited thermal conductivity portion to limit the amount of heat dissipated by the passive heat dissipation mechanism.

SUMMARY

A heat exchanger is disclosed. The heat exchanger includes a first heat dissipation mechanism having a first heat dissipation capacity and a second heat dissipation having a second heat dissipation capacity. At least one heat transfer mechanism thermally couples the first heat dissipation mechanism and the second heat dissipation mechanism to a heat generating component. The heat transfer mechanism has a limited conductivity portion in the thermal path to either the first or the second heat dissipation mechanism.

BRIEF DESCRIPTION OF THE FIGURES

The present invention is illustrated by way of example and not limitation in the figures of the accompanying drawings.

DETAILED DESCRIPTION

The following description provides a heat exchanger utilizing active and passive mechanisms. In the following description, numerous specific details such as particular component sizes and types as well as particular physical locations for components and heat dissipation mechanisms are set forth in order to provide a more thorough understanding of the present invention. It will be appreciated, however, by one skilled in the art that the invention may be practiced without such specific details.

The present invention advantageously utilizes multiple heat dissipation devices to cool a portable computing device. In one embodiment, active and passive heat dissipation devices are used, such that the active heat dissipation device may be enabled at a power level which may vary depending on whether the heat generating component is operating at a certain power or temperature level or in a particular mode, such as when external power is applied. Furthermore, one embodiment utilizes a limited thermal conductivity portion in a thermal path and may therefore provide separate thermal paths which have thermal conductivities proportional to the heat dissipation capacity of the different heat dissipation devices connected thereto. Such varying thermal conductance may allow a keyboard to maintain an acceptable temperature by limiting the amount of heat transferred to a heat dissipation plate beneath the keyboard.

Figure 1:
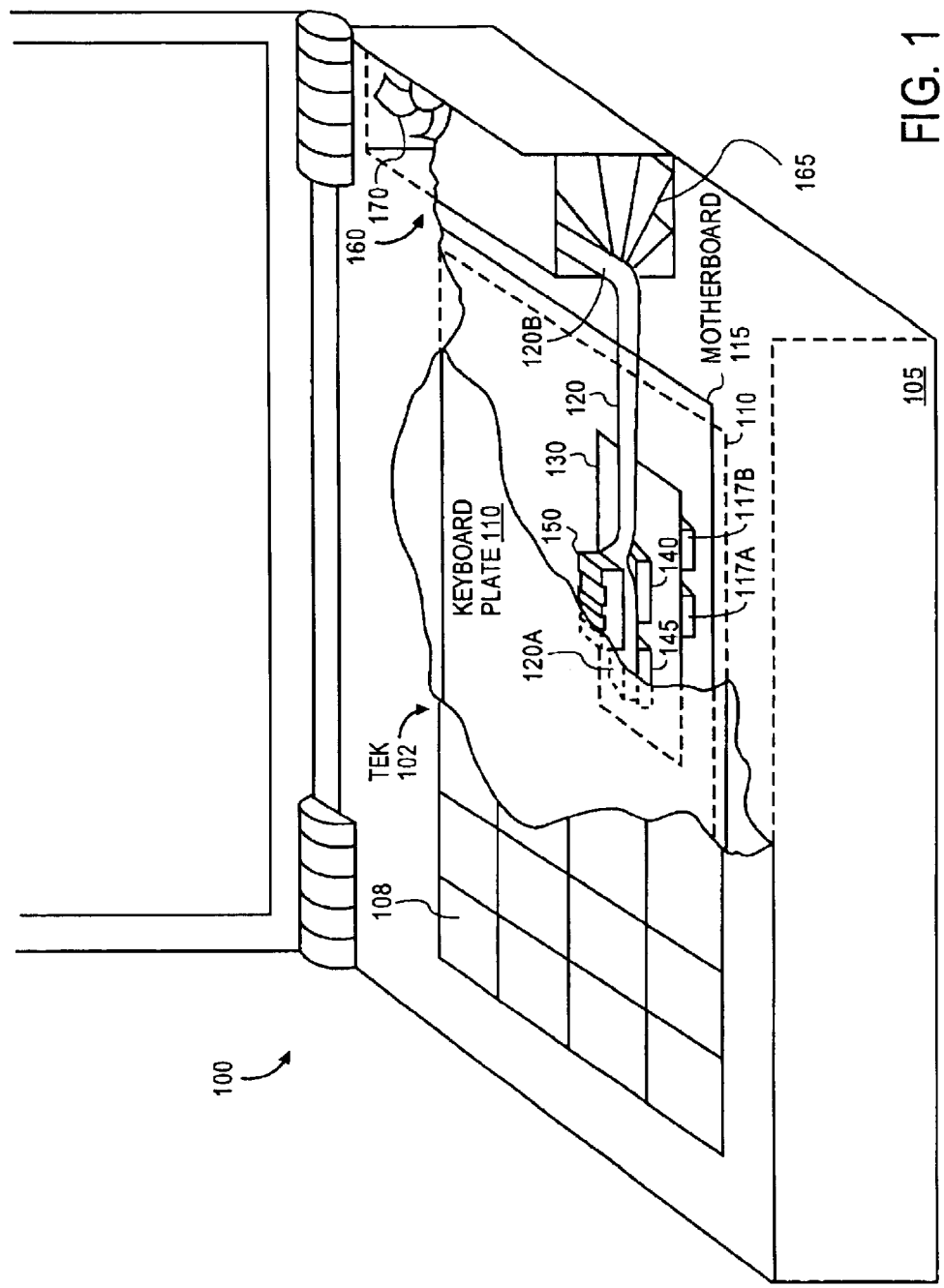
FIG. 1 illustrates one embodiment of a portable computing device.

FIG. 1 illustrates a portable computing device 100. The portable computing device may be a notebook or laptop computer or another type of computing device such as a personal organizer, personal digital assistant, or any similar type of computing device. Additionally, the heat exchanger may be utilized in non-portable computing devices.

A base portion 105 of the portable computing device 100 includes a thermally enhanced keyboard (TEK) 102. In one embodiment, the TEK includes a keypad 108 and a keyboard plate 110 which may be used to dissipate heat through the keypad 108. In another embodiment, the keyboard plate 110 may be one or more flat heat pipes which are integrally formed or otherwise affixed beneath the keypad 108. An integral keyboard and heat pipe is described in U.S. patent application Ser. No. 08/854,185 entitled "Integral Keyboard and Heat Pipe," filed May 9, 1997, which is hereby incorporated by reference.

The base portion 105 includes a motherboard 115 which is connected to a processor module 130 by connectors 117a and 117b. In the illustrated embodiment, two heat generating components are mounted on the processor module 130. In one embodiment, these heat generating components are a processor 140 and a bridge 145. In other embodiments, other integrated circuits or the module 130 itself may be cooled.

In the illustrated embodiment, a heat pipe 120 has a first portion 120a which is thermally coupled to the bridge 145 and the processor 140. This first portion 120a of heat pipe 120 may be flattened as it contacts the processor 140 and the bridge 145. The heat pipe 120 may then return to a cylindrical shape as it moves away from the module 130. Alternatively, the entire heat pipe 120 may be flat or may be formed into any shape which can be thermally coupled to heat generating components such as the processor 140 and the bridge 145.

A second portion 120b of the heat pipe 120 extends away from the module 130 toward a rear corner of the base portion 105. At the rear corner of the base portion 105 is an active heat dissipation device, in this embodiment a fan based beat exchanger 160. The fan based heat exchanger 160 forms a duct which channels air driven by a fan 170. Heat dissipation fins 165 are directly welded to the heat pipe 120 to minimize the number of interfaces through which the heat must pass. Additionally, the outer housing of the heat exchanger 160 may be a heat conductive material and may also be welded to the second portion 120b of heat pipe 120.

In alternative embodiments, the fins and duct may be otherwise arranged. It is generally preferred to directly attach the fins to the heat pipe or extrude the fins and the heat pipe as one unified body. For example, a flat heat pipe may be extruded to have fins extending perpendicular to flat portions of the heat pipe. With the fins extending from the heat pipe (especially if fins extend axially in all directions from the heat pipe), the duct which channels air may be formed by plastic or other materials.

The passive portion of the heat exchanger is formed by the keyboard plate 110. The keyboard plate 110 is thermally coupled to the processor 140 and the bridge 145 via a heat path which includes a limited conductivity portion (a heat transfer block 150 in this embodiment) to limit the amount of heat transferred to the passive element (the keyboard plate 110). As illustrated, the heat transfer block 150 may have grooves on one surface thereby limiting the amount of surface contact and hence the thermal conductivity along the thermal path to the passive heat dissipation device.

Figure 2A:
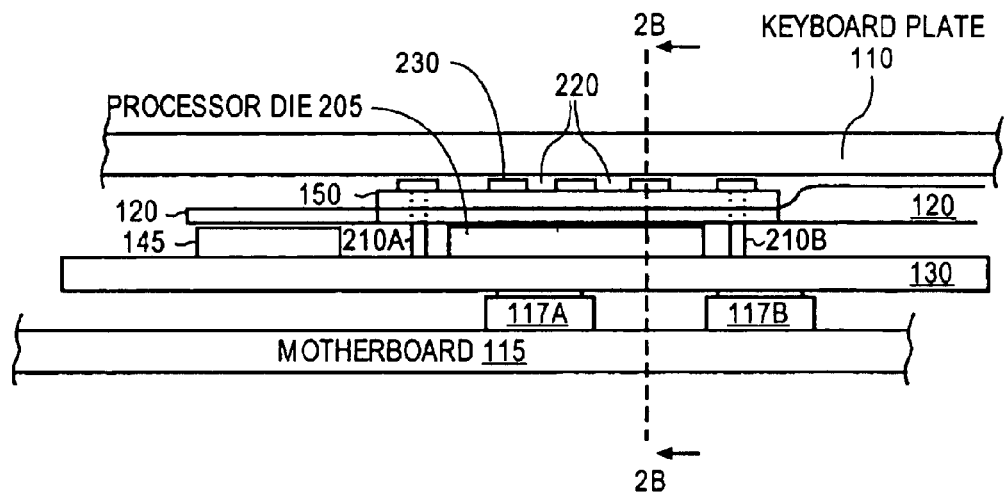
FIG. 2a illustrates a front cross sectional view of one embodiment of the attachment of a heat dissipation mechanism to a heat generating component.

Further details of one embodiment of the connection between the heat pipe 120 and the heat generating components are shown in FIG. 2a. The processor 140 shown in FIG. 1 includes a processor die 205 as well as a number of contacts (not shown) for making electrical connections with the processor module 130. In this embodiment, the first portion 120a of the heat pipe 120 is directly connected to the processor 205. A thermal grease or other similar material such as a compressive and thermally conductive elastomer may be used to enhance the thermal transfer characteristics of the direct connection between the processor die 205 and the heat pipe 120. In contrast, prior art techniques typically employ a thermal transfer block or a slug between a processor die and a heat pipe.

According to the embodiment illustrated in FIG. 2a, the thermally conductive heat transfer block 150 is fastened on top of the processor die 205 and the heat pipe 120. The heat transfer block 150 is fastened to the processor module 130 by four fasteners, one on each corner. From the illustrated perspective, only two fasteners may be seen, fasteners 210a and 210b. The heat transfer block 150 in this embodiment includes grooves 220 which reduce the thermal conductivity of the thermal path from the processor die 205 and the bridge 145 to the keyboard plate 110. Indeed, only the ridge portions such as the ridge 230 contact the keyboard plate. A particular thermal conductivity may be achieved by adjusting the groove/ridge arrangement.

A decreased thermal conductivity (higher thermal resistance or theta) is intentionally produced in order to limit the heat transferred to the keyboard plate. If too much heat is transferred to the keyboard plate 110, the keyboard may become dangerously hot or at least may exceed a desired maximum temperature. Thus, the thermal conductivity of this path may be set by adjusting the thermal conductivity of the limited conductivity portion (i.e., in this embodiment the grooved block) of the path.

The thermal conductivity selected for the thermal path from the processor die 205 to the keyboard plate 110 and the thermal conductivity of the thermal path from the processor die 205 to the fan based heat exchanger 160 are proportional to the heat dissipation capacity of the keyboard plate 110 and the heat dissipation capacity of the fan based heat exchanger 160. In other words, the thermal conductivities may be selected such that their ratio equals or is similar to the ratio of the heat dissipation capacities.

The heat dissipation capacity for the keyboard plate 110 is defined as the amount of heat the keyboard plate 110 can dissipate while remaining in the desired operating temperature range. The heat dissipation of the fan based heat exchanger 160 may vary with the power level (e.g., off, minimum, maximum, etc.) the fan 170. Thus, the ratio may be matched for a particular power level of the fan as needed to assure that the keyboard maintains an acceptable temperature. Since a variety of fan speeds may be used, the fact that thermal paths are proportional to heat dissipation capacities does not imply that a strict mathematical equality of ratios must exist. Rather, the relative heat dissipation capacities are reflected in the respective thermal paths by the same general relationship (e.g., greater than, less than, approximately twice, etc.).

In one embodiment, the processor die 205 is capable of generating up to approximately twenty watts. Of this power, approximately four watts may be safely dissipated using the keyboard plate 110. The remaining heat may be dissipated via the active heat dissipation mechanism. Thus, in this embodiment, the thermal path to the active heat dissipation mechanism (e.g., the fan based heat exchanger 160) has approximately four times the thermal conductivity of the thermal path to the keyboard plate 110. In other embodiments, this ratio may vary substantially. Not only does the ratio depend on the heat dissipation capacity of both the active and passive mechanisms, but it also may depend on the total amount of heat generated by the heat generating devices and whether the devices can operate in different power consumption modes.

Figure 2B:
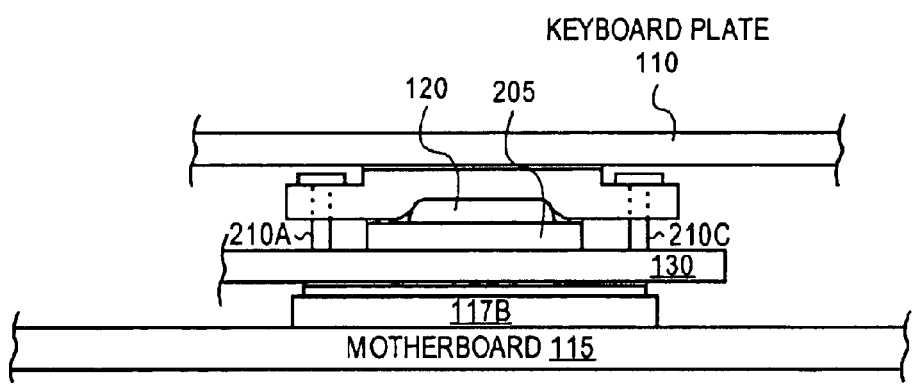
FIG. 2b illustrates a side cross sectional view of the embodiment of FIG. 2a taken along section line 2B—2B.

A side view of the arrangement of FIG. 2a as taken through section line 2B—2B of FIG. 2a is shown in FIG. 2b. FIG. 2b illustrates that the first portion 120a of the heat pipe 120 may be flattened to contact the processor die 205 with a larger surface area than might be possible with a cylindrical heat pipe. Indeed, in some embodiments, the entire heat pipe 120 may be flat or rectangular. FIG. 2b also illustrates how the heat transfer block conforms to the shape of the portion of the heat pipe 120 which is directly attached to the processor die 205. Additionally, FIG. 2b illustrates one of the rear fasteners, fastener 210c.

Figure 3A:
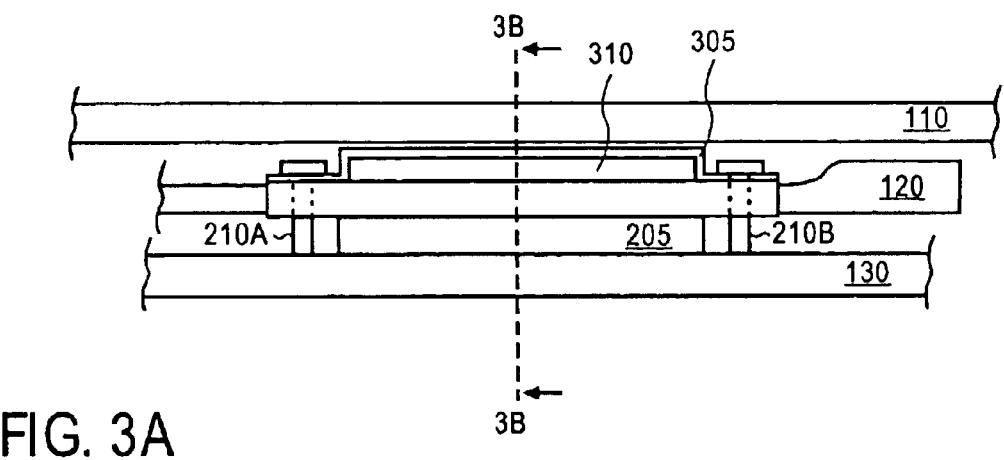
FIG. 3A illustrates a front cross sectional view of the attachment of a heat dissipation mechanism to a heat generating component according to another embodiment.
Figure 3B:
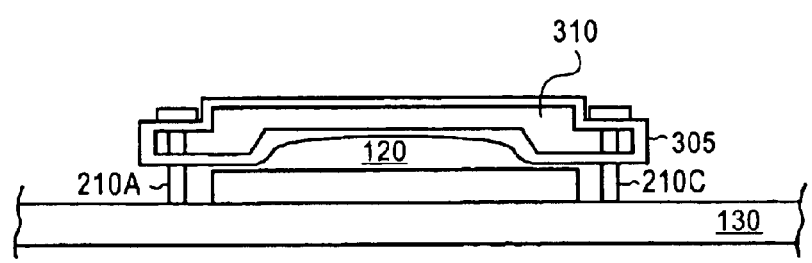
FIG. 3b illustrates a side cross sectional view of the embodiment of FIG. 3a taken along section line 3B—3B.

FIGS. 3a and 3b illustrate one alternative embodiment of the heat transfer block 150. FIG. 3b illustrates a side cross section view of the embodiment of FIG. 3a taken through section lines 3B—3B. As illustrated in these figures, the limited conductivity portion of the thermal path away from the heat generating components may be formed using a hollow heat transfer block 305 which has a cavity 310 filled with a material having a lower thermal conductivity than the outer surface of the heat transfer block 305. In one embodiment, the heat transfer block 305 is aluminum and the cavity is filled with air. The exact materials used are not crucial, and varying conductivities may be achieved by varying either the materials or the proportion of the highly conductive material to that which is not.

Figure 4:
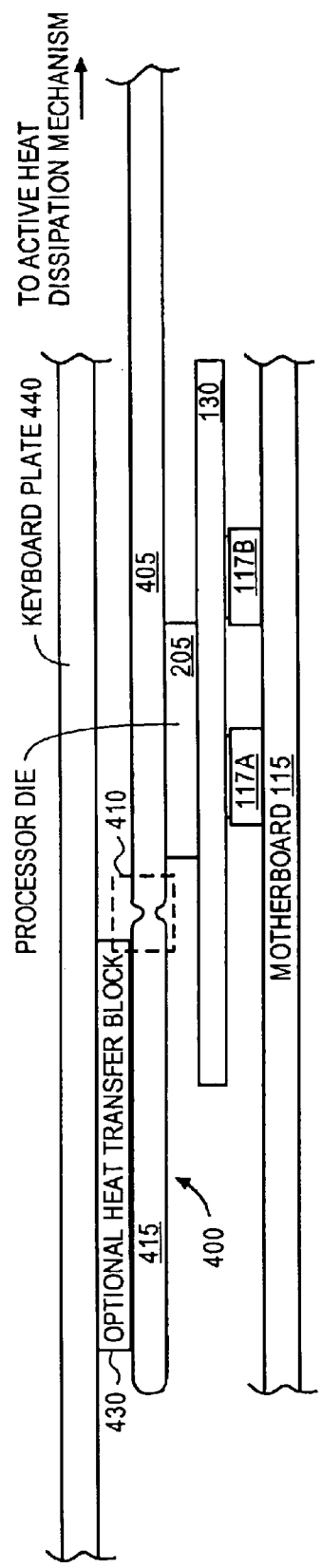
FIG. 4 illustrates one embodiment of the use of a variable conductivity heat pipe.

FIG. 4 illustrates one alternative embodiment which utilizes a variable thermal conductivity heat pipe 400 with two portions 405 and 415 to provide the two different thermal paths to the active and passive heat dissipation mechanisms. In this embodiment, a throttling portion 410 of the heat pipe 400 forms the limited conductivity portion which allows a smaller amount of heat to be transferred the passive heat dissipation mechanism, the keyboard plate 440.

The throttling portion 410 may be formed during manufacture of the heat pipe 400 or may be mechanically produced by pressure or bending of the heat pipe 400. The throttling portion 410 could also be formed by using a throttle valve which internally narrows the heat pipe and thereby limits heat flow. Alternatively, the heat pipe 400 may be pinched such that the first portion 405 and the second portion 415 form separate evaporator and condenser portions. One further alternative is for the first portion 405 to be a heat pipe and the second portion to include a gas reservoir separated from the heat pipe portion by a vapor-gas interface. The vapor-gas interface allows heat to be transferred between the two portions but keeps the vapor from the heat pipe portion separate from a gas (e.g., an inert gas) in the gas reservoir portion.

Thus the limited conductivity portion may include a throttling portion and another high thermal conductivity portion or may include an entire portion having lower thermal conductivity. In any case, the limited conductivity portion may be used to limit the flow of heat to the keyboard plate 440 to apportion heat from the processor die 205 to the active heat dissipation mechanism and the keyboard plate 440 such the heat keyboard remains at an acceptable temperature.

Additionally, an optional heat transfer block 430 may be used to thermally couple the second portion 415 of the heat pipe 400 to the keyboard plate 440. The heat transfer block 430 may not be necessary if the heat pipe 400 is bent or otherwise arranged such that a direct connection to the keyboard plate may be made. On the other hand, the heat transfer block 430 may also be used to limit the heat flow to the keyboard plate 440. The heat transfer block 430 is not required because the variable thermal conductivity heat pipe 400 may alone limit the conductivity of the path to the keyboard plate 440.

Figure 5:
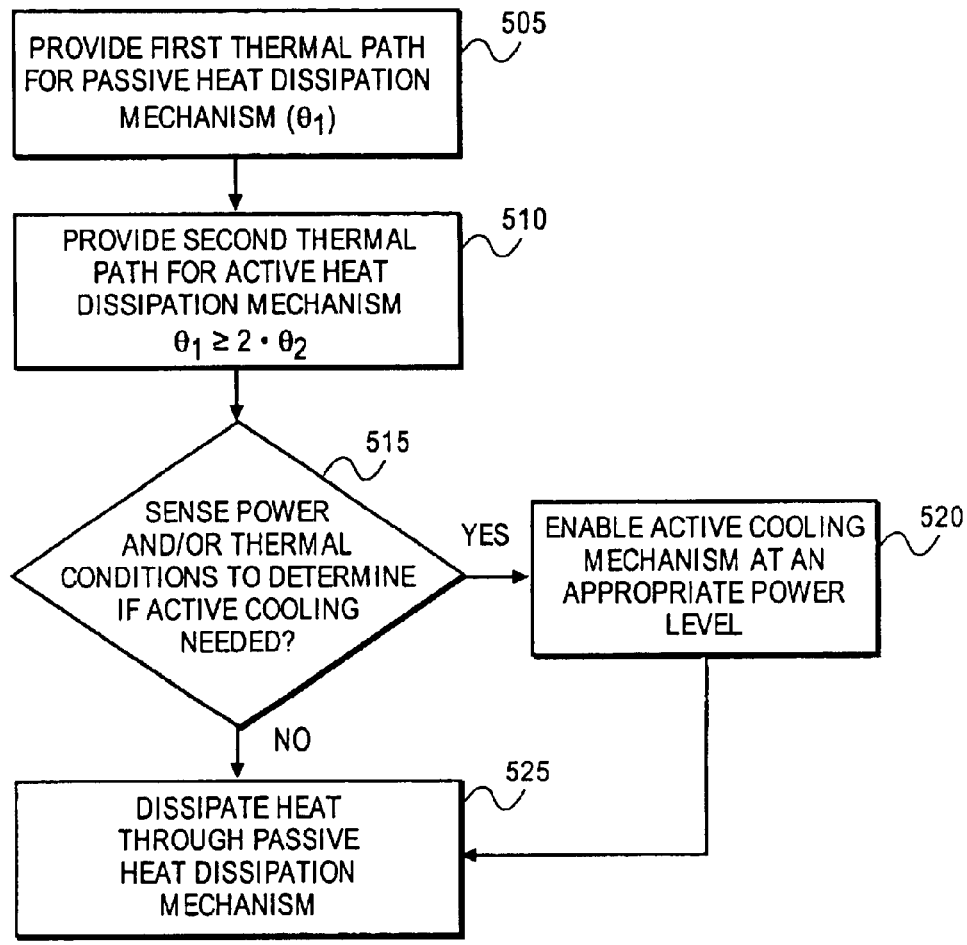
FIG. 5 illustrates one embodiment of a method for cooling a heat generating component.

FIG. 5 illustrates one embodiment of a method of utilizing active and passive heat dissipation components. As shown in block 505, a first thermal path for transferring heat to a passive heat dissipation mechanism is provided. This first thermal path has a thermal resistance of $\theta_1$. A second thermal path to an active heat dissipation mechanism is provided as shown in block 510. The first thermal path has a substantially greater thermal resistance than the thermal resistance of the second thermal path($\theta_2$). For example, $\theta_1$ may be at least twice $\theta_2$.

As shown in block 515, the system senses power and/or thermal conditions to determine if active cooling is needed. In a portable computing device, the processor may include a temperature sensor, and other temperature sensors may be included on circuit boards or other computer system components such as CD ROM drives. Additionally, it may be sensed whether external (e.g., alternating current) power is being supplied.

Depending on the various temperature measurements and whether external or battery power is being supplied, the active cooling mechanism may be enabled as shown in block 520. In fact, an active cooling mechanism such as a fan may be capable of operating at a number of power levels depending on these conditions. For example, the temperature which first causes a fan to be enabled may be higher if the system is operating on battery power.

As shown in block 525, whether or not the active heat dissipation mechanism is enabled, the passive heat dissipation mechanism may be used. In conjunction with the variable cooling available from the active heat dissipation mechanism, this combination can provide an intelligent system which provides multiple levels of heat dissipation and limits battery consumption.

Thus, the present invention provides a heat exchanger utilizing active and passive mechanisms. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A heat exchanger comprising:
   a first heat dissipation mechanism having a first heat dissipation capacity;
   a second heat dissipation mechanism having a second heat dissipation capacity;
   a non-branched variable thermal conductivity heat pipe having a first portion physically coupled to a heat generating component, a second portion physically coupled to the first heat dissipation mechanism, and a third portion separated from the first portion and the second portion by a limited conductivity portion and thermally coupled to the second heat dissipation mechanism.

2. The heat exchanger of claim 1 wherein the non-branched variable thermal conductivity heat pipe has a first thermal path with a first thermal conductivity which couples the heat generating component to the first heat dissipation mechanism and has a second thermal path with a second thermal conductivity which couples the heat generating component to the second heat dissipation mechanism and wherein the first thermal conductivity is at least twice the second thermal conductivity and the first heat dissipation mechanism is an active heat dissipation mechanism.

3. The heat exchanger of claim 2 wherein the heat generating component is a processor and wherein the first thermal conductivity is approximately four times the second thermal conductivity.

4. The heat exchanger of claim 1 wherein the first heat dissipation mechanism is an active heat dissipation mechanism that is enabled depending on at least a temperature of the heat temperature of the heat generating component.

5. The beat exchanger of claim 1 wherein the first heat dissipation mechanism is a fan based heat exchanger and wherein the second heat dissipation mechanism is a thermal conductive plate beneath and substantially parallel to a keyboard.

6. The heat exchanger of claim 1 wherein the limited conductivity portion is a narrowed portion of the non-branched variable thermal conductivity heat pipe.

7. A system comprising:
   an electronic component;
   a non-branched variable thermal conductivity heat pipe having a first portion and a second portion separated by a throttling portion, the electronic component being physically coupled to the first portion; and
   a first heat dissipation mechanism physically coupled to the first portion of the non-branched variable thermal conductivity heat pipe; and
   a second heat dissipation mechanism physically coupled to the second portion of the non-branched variable thermal conductivity heat pipe.

8. The system of claim 7 wherein the first heat dissipation mechanism is a fan based heat exchanger including a fan and a plurality of fins which are directly welded to the heat pipe.

9. The system of claim 8 wherein said electronic component is coupled to said first portion of said non-branched variable thermal conductivity heat pipe.

10. The system of claim 8 wherein the limited conductivity portion is a narrowed portion of the non-branched variable thermal conductivity heat pipe.

11. The system of claim 8 wherein the second heat dissipation mechanism is a heat dissipation plate affixed beneath and substantially parallel to a keyboard.

12. An apparatus comprising:
    at least one electronic component;
    a non-branched heat pipe having a limited conductivity portion, the heat pipe having a first portion physically coupled to the at least one electronic component;
    a fan based heat exchanger physically coupled to a second portion of the heat pipe; and
    a metallic plate physically coupled to a third portion of the heat pipe and separated from the first portion that is connected to the at least one electronic component by the limited conductivity portion of the non-branched heat pipe.

13. The apparatus of claim 12 wherein the metallic plate comprises a plate substantially beneath a keyboard.

14. The apparatus of claim 13 wherein the metallic plate comprises a portion of a thermally enhanced keyboard.

15. The apparatus of claim 12 wherein said limited thermal conductivity portion of said non-branched heat pipe comprises a narrowed portion of said heat pipe.

16. The apparatus of claim 12 wherein said electronic component is a processor and is coupled to said first portion of said non-branched heat pipe.

17. The apparatus of claim 12 wherein the limited conductivity portion is narrowed.

* * * * *

UNITED STATES PATENT AND TRADEMARK OFFICE
CERTIFICATE OF CORRECTION

PATENT NO. : 6,848,499 B1
DATED : February 1, 2005
INVENTOR(S) : Bhatia

It is certified that error appears in the above-identified patent and that said Letters Patent is hereby corrected as shown below:

Column 7,
Line 40, delete "beat" and insert -- heat --.

Signed and Sealed this

Tenth Day of May, 2005

JON W. DUDAS
*Director of the United States Patent and Trademark Office*